United States Patent
Kim et al.

(10) Patent No.: US 10,797,346 B2
(45) Date of Patent: Oct. 6, 2020

(54) SOLID POLYMER ELECTROLYTE COMPRISING AN ALKOXYSILANE COMPOUND HAVING A URETHANE BOND, A METHOD OF PREPARING THE ELECTROLYTE, AND A LITHIUM SECONDARY BATTERY INCLUDING

(71) Applicant: KOREA INSTITUTE OF INDUSTRIAL TECHNOLOGY, Cheonan-si, Chungcheongnam-do (KR)

(72) Inventors: Ki Young Kim, Seoul (KR); Bong Sang Cho, Seoul (KR); Jun Choi, Seoul (KR); Ji San Jeong, Asan-si (KR); Kyung Min Kim, Seoul (KR); Seong Kwan Kim, Cheongju-si (KR); Yong Pyo Lee, Cheongju-si (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 142 days.

(21) Appl. No.: 16/186,624

(22) Filed: Nov. 12, 2018

(65) Prior Publication Data

US 2019/0288333 A1    Sep. 19, 2019

(30) Foreign Application Priority Data

Mar. 19, 2018  (KR) .................. 10-2018-0031541

(51) Int. Cl.
*H01M 10/0565* (2010.01)
*H01M 10/0525* (2010.01)
*C08G 77/54* (2006.01)

(52) U.S. Cl.
CPC ........ *H01M 10/0565* (2013.01); *C08G 77/54* (2013.01); *H01M 10/0525* (2013.01); *H01M 2300/0085* (2013.01)

(58) Field of Classification Search
CPC ........ H01M 10/0525; H01M 10/0565; H01M 2300/0082; H01M 2300/0085; C08G 77/54
See application file for complete search history.

(56) References Cited

FOREIGN PATENT DOCUMENTS

JP    2010-113819 A    5/2010
KR    10-1087494 B1   11/2011

OTHER PUBLICATIONS

V. Jovanovski, U. L. Štangar, B. Orel. Urethanosil ionic nanocomposite gel conductors with an ionic liquid: Redox electrolytes for electrochemical devices, Acta Chim. Slov. 2004, 51, 47-57.*

Z. Bai, B.E. Taylor, J.M. Haag, M.F. Durstock, T.D. Dang. In-situ generated PEO—SiO2 nanocomposite electrolytes for lightweight, flexible batteries, Proceedings Published 2011 by the American Chemical Society.*
V. de Zea Bermudez et al., "Synthesis and characterization of novel urethane cross-linked ormolytes for solid-state lithium batteries", Solid State Ionics, 1999, pp. 197-209, vol. 116.
Ilyas Kartal, Toughening of Epoxy Resin via Silane Terminated Urethane Including Pre-Hydrolyzed Tetraethoxysilane, Asian Journal of Chemistry, 2014, pp. 6018-6022, vol. 26, No. 18.
Korean Office Action dated Apr. 29, 2019.

* cited by examiner

*Primary Examiner* — Carlos Barcena
(74) *Attorney, Agent, or Firm* — Rabin & Berdo, P.C.

(57) ABSTRACT

A solid polymer electrolyte includes a matrix prepared by subjecting an alkoxysilane compound having a urethane bond represented by Structural Formula 1 below and an alkoxysilane compound represented by Structural Formula 2 below to a sol-gel reaction; and a lithium salt dispersed in the matrix, Structural Formula 1

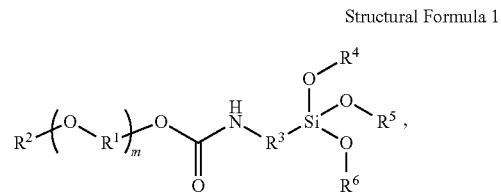

and

Structural Formula 2

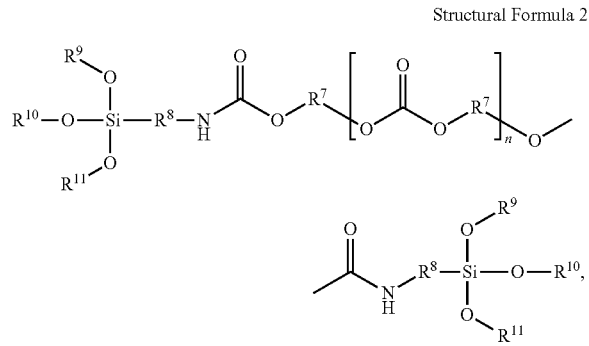

The solid polymer electrolyte composition is configured such that silsesquioxane is linked to a polycarbonate diol-based polymer chain having a urethane bond. The solid polymer electrolyte exhibits superior compatibility, stability, flexibility, mechanical properties and ionic conductivity.

17 Claims, 5 Drawing Sheets

SOLID POLYMER ELECTROLYTE COMPRISING AN ALKOXYSILANE COMPOUND HAVING A URETHANE BOND, A METHOD OF PREPARING THE ELECTROLYTE, AND A LITHIUM SECONDARY BATTERY INCLUDING

BACKGROUND OF THE INVENTION

1. Technical Field

The present invention relates to a solid polymer electrolyte composition comprising an alkoxysilane compound having a urethane bond and a method of preparing the same. More particularly, the present invention relates to a solid electrolyte, comprising an alkoxysilane compound having a urethane bond, a silica precursor, a lithium salt and a polycarbonate-based diol polymer having a urethane bond, and to a method of preparing the same.

2. Description of the Related Art

With the rapid development of electrical, electronic and computer industries, there is a growing need for secondary batteries having high performance and high stability. In particular, due to the trend toward miniaturization and portability of electrical and electronic products, secondary batteries, which are essentially used in such fields, are required to be thinned and miniaturized.

A lithium polymer secondary battery including a solid electrolyte does not have the drawbacks of an existing lithium ion battery using a liquid electrolyte. Specifically, a lithium polymer secondary battery may exhibit superior stability and low manufacturing cost, and may be used for the fabrication of a large-sized battery. Moreover, few limitations are imposed on the size or shape of the battery.

Conventionally, in order to increase the ionic conductivity of the polymer electrolyte, the addition of a plasticizer that lowers crystallinity has been devised, but is problematic because the compatibility of the plasticizer is low.

CITATION LIST

Patent Literature (Patent Document 0001) KR 1087494 B

SUMMARY OF THE INVENTION

Accordingly, the present invention has been made keeping in mind the problems encountered in the related art, and the present invention is intended to provide a solid polymer electrolyte composition, comprising a matrix including alkoxysilane having a urethane bond, a silica precursor and a polymer configured such that silsesquioxane is linked to a polycarbonate diol-based polymer chain having a urethane bond, and a lithium salt.

In addition, the present invention is intended to provide a solid polymer electrolyte composition, having superior compatibility, stability, flexibility, mechanical properties, and ionic conductivity, and a method of preparing the same.

An aspect of the present invention provides an alkoxysilane compound having a urethane bond, represented by Structural Formula 1 below.

[Structural Formula 1]

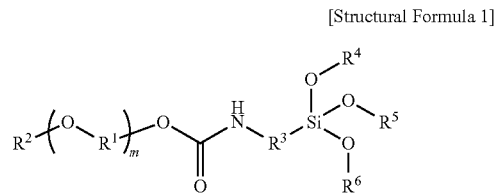

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

Preferably, $R^1$ is a C1 to C10 alkylene group, $R^2$ is a C1 to C10 alkyl group, $R^3$ is a C1 to C10 alkylene group, and $R^4$ to $R^6$ are the same as or different from each other, and are each independently a C1 to C10 alkyl group.

Another aspect of the present invention provides a solid polymer electrolyte, comprising: a matrix prepared by subjecting a compound represented by Structural Formula 1 below and an alkoxysilane compound including a compound represented by Structural Formula 2 below to a sol-gel reaction; and a lithium salt dispersed in the matrix.

[Structural Formula 1]

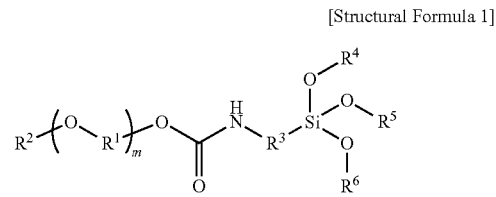

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

[Structural Formula 2]

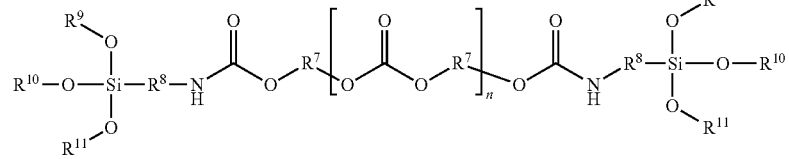

In Structural Formula 2, $R^7$ is independently a C1 to C20 alkylene group, $R^8$ is independently a C1 to C20 alkylene group, $R^9$ to $R^1$ are the same as or different from each other, and are each independently a C1 to C20 alkyl group, and n is any one integer of 1 to 30.

The alkoxysilane compound may further include a compound represented by Structural Formula 3 below.

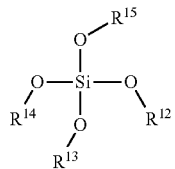

[Structural Formula 3]

In Structural Formula 3, $R^{12}$ to $R^{15}$ are the same as or different from each other, and are each independently a C1 to C20 alkyl group.

Preferably, $R^7$ is independently a C4 to C10 alkylene group, $R^8$ is independently a C1 to C6 alkylene group, and $R^9$ to $R^{11}$ are the same as or different from each other, and are each independently a C1 to C6 alkyl group.

Also, n may be any one integer of 6 to 20.

The compound represented by Structural Formula 2 may have a weight average molecular weight (Mw) of 2,000 to 200,000.

The lithium salt may include at least one selected from among a lithium bis(trifluoromethane)sulfonimide salt, lithium perchlorate, lithium hexafluorophosphate, lithium tetrafluoroborate, and lithium trifluoromethanesulfonate.

The solid polymer electrolyte may include 1 to 30 wt % of the compound represented by Structural Formula 1 below; 15 to 50 wt % of the compound represented by Structural Formula 2 below; and 10 to 70 wt % of the lithium salt.

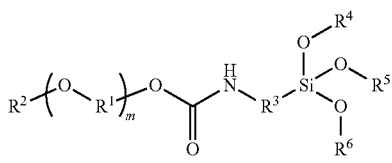

[Structural Formula 1]

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

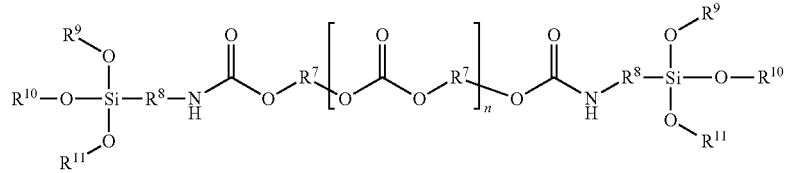

[Structural Formula 2]

In Structural Formula 2, $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

The solid polymer electrolyte may further include 0.5 to 20 wt % of the compound represented by Structural Formula 3 below.

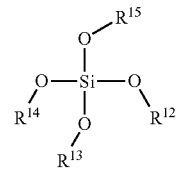

[Structural Formula 3]

In Structural Formula 3, $R^{12}$ to $R^{15}$ are the same as or different from each other, and are each independently a C1 to C20 alkyl group.

Still another aspect of the present invention provides a lithium secondary battery comprising the solid polymer electrolyte.

Yet another aspect of the present invention provides a method of preparing a solid polymer electrolyte, comprising: (a) preparing an alkoxysilane compound having a urethane bond represented by Structural Formula 1 below by reacting an alkoxy alcohol represented by Structural Formula 4 below with an isocyanate-based compound represented by Structural Formula 5 below; (b) preparing an alkoxysilane compound represented by Structural Formula 2 below by subjecting a polycarbonate diol represented by Structural Formula 6 below and an isocyanate-based silane represented by Structural Formula 7 below to a condensation reaction; (c) preparing a mixture by mixing the alkoxysilane compound having a urethane bond represented by Structural Formula 1 below, the alkoxysilane compound represented by Structural Formula 2 below, and a lithium salt; and (d) preparing a solid polymer electrolyte by subjecting the mixture to a sol-gel reaction.

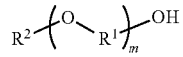

[Structural Formula 4]

In Structural Formula 4, $R^1$ is a C1 to C20 alkylene group, $R^2$ is a C1 to C20 alkyl group, and m is any one integer of 1 to 20.

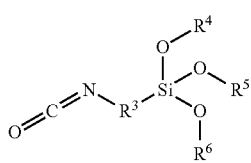

[Structural Formula 5]

In Structural Formula 5, $R^3$ is a C1 to C20 alkylene group, and $R^4$ to $R^6$ are the same as or different from each other, and are each independently a C1 to C20 alkyl group.

[Structural Formula 1]

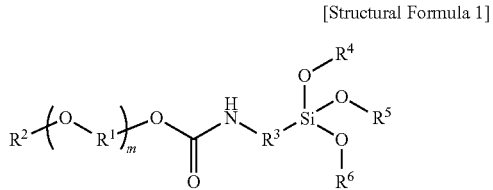

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

[Structural Formula 6]

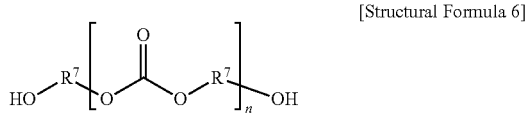

In Structural Formula 6, $R^7$ is independently a C1 to C20 alkylene group, and n is any one integer of 1 to 30.

[Structural Formula 7]

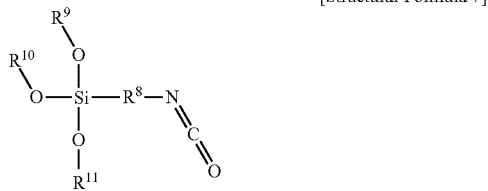

In Structural Formula 7, $R^8$ is independently a C1 to C20 alkylene group, and $R^9$ to $R^{11}$ are the same as or different from each other, and are each independently a C1 to C20 alkyl group.

[Structural Formula 2]

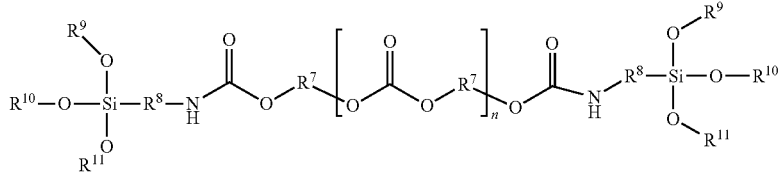

In Structural Formula 2, $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

In step (c), a compound represented by Structural Formula 3 below may be further included.

[Structural Formula 3]

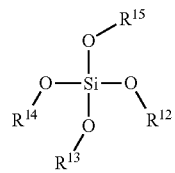

In Structural Formula 3, $R^{12}$ to $R^{15}$ are the same as or different from each other, and are each independently a C1 to C20 alkyl group.

The alkoxy alcohol may include at least one selected from among 2-(2-methoxyethoxy)ethanol, diethylene glycol methyl ether, triethylene glycol methyl ether, monoethylene glycol ethyl ether, diethylene glycol ethyl ether, diethylene glycol propyl ether, and diethylene glycol butyl ether.

The isocyanate-based compound may include at least one selected from among 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate.

The polycarbonate diol may include at least one selected from among poly(1,6-hexanediol)carbonate, poly(1,5-pentanediol)carbonate, poly(1,4-butanediol)carbonate, poly(1,3-propanediol)carbonate, and poly(ethyleneglycol)carbonate.

In step (b), the polycarbonate diol represented by Structural Formula 6 and the isocyanate-based silane represented by Structural Formula 7 are reacted at a molar ratio of 1:2 to 1:2.5.

In step (d), a matrix may be formed through the sol-gel reaction.

Still yet another aspect of the present invention provides a method of manufacturing a lithium secondary battery including the method of preparing the solid polymer electrolyte as above.

According to the present invention, a solid polymer electrolyte composition comprises a matrix, including alkoxysilane having a urethane bond, a silica precursor and a polymer configured such that silsesquioxane is linked to a polycarbonate diol-based polymer chain having a urethane bond, and a lithium salt.

Also, according to the present invention, the solid polymer electrolyte can exhibit superior compatibility, stability, flexibility, mechanical properties, and ionic conductivity.

DESCRIPTION OF SPECIFIC EMBODIMENTS

Figure 1:
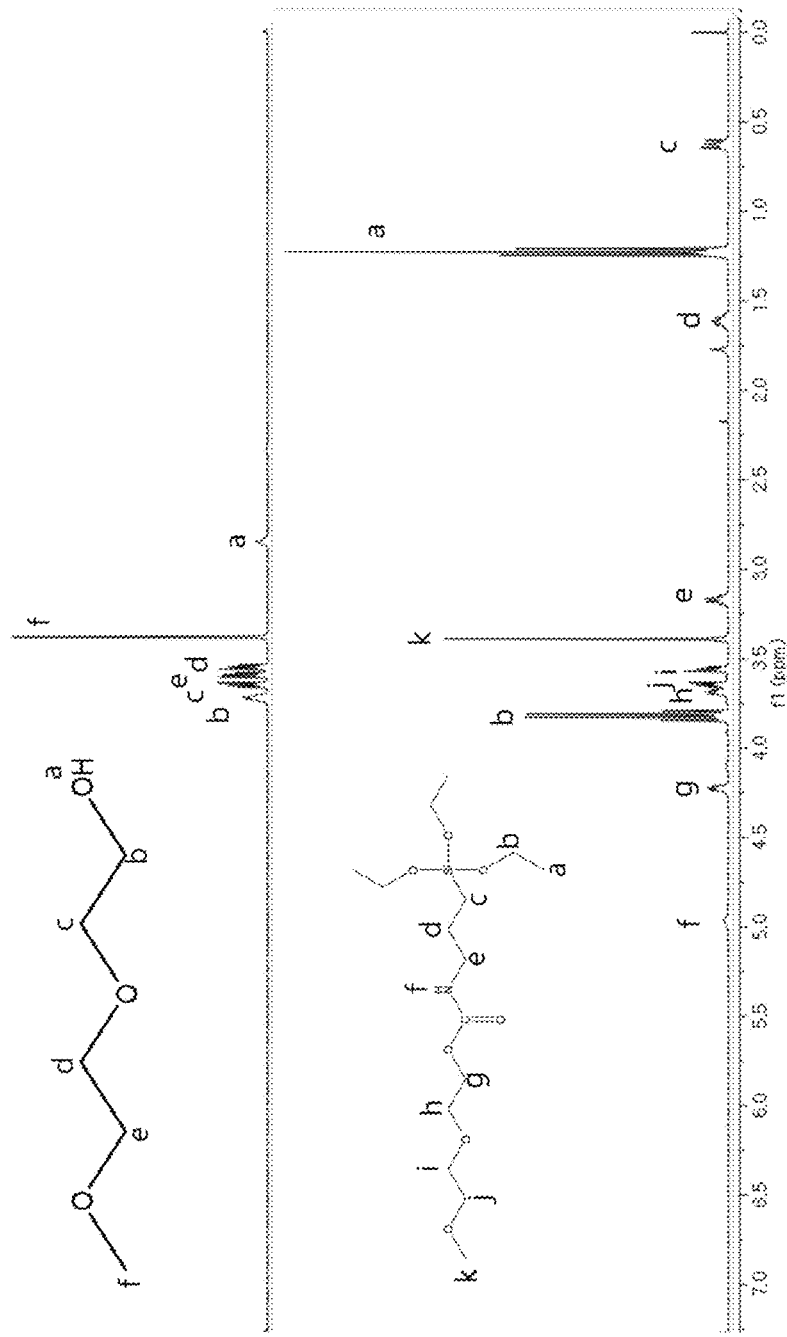
FIG. 1 shows the results of nuclear magnetic resonance (NMR) analysis of an alkoxysilane compound having a urethane bond prepared in Example 1.

The present invention may be embodied in many different forms, and should not be construed as being limited only to the embodiments set forth herein, but should be understood to cover all modifications, equivalents or alternatives falling within the ideas and technical scope of the present invention. In the description of the present invention, detailed descriptions of related known techniques incorporated herein will be omitted when the same may make the gist of the present invention unclear.

As used herein, the terms "first", "second", etc. may be used to describe various elements, but these elements are not to be limited by these terms. These terms are only used to distinguish one element from another. For example, a first element may be termed a second element, and similarly, a second element may be termed a first element, without departing from the scope of the present invention.

Further, it will be understood that when an element is referred to as being "formed" or "stacked" on another element, it can be formed or stacked so as to be directly attached to all surfaces or one surface of the other element, or intervening elements may be present therebetween.

Unless otherwise stated, the singular expression includes a plural expression. In this application, the terms "comprise", "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

Below is a description of an alkoxysilane compound having a urethane bond according to the present invention.

The present invention pertains to an alkoxysilane compound having a urethane bond, represented by Structural Formula 1 below.

[Structural Formula 1]

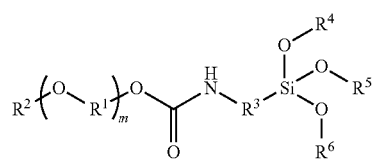

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

Preferably, $R^1$ is a C1 to C10 alkylene group, $R^2$ is a C1 to C10 alkyl group, $R^3$ is a C1 to C10 alkylene group, and $R^4$ to $R^6$ are the same as or different from each other, and are each independently a C1 to C10 alkyl group.

More preferably, $R^1$ is a C1 to C6 alkylene group, $R^2$ is a C1 to C6 alkyl group, $R^3$ is a C1 to C6 alkylene group, and $R^4$ to $R^6$ are the same as or different from each other, and are each independently a C1 to C6 alkyl group.

Much more preferably, $R^1$ is a C1 to C5 alkylene group, $R^2$ is a C1 to C5 alkyl group, $R^3$ is a C1 to C3 alkylene group, and $R^4$ to $R^6$ are the same as or different from each other, and are each independently a C1 to C3 alkyl group.

Preferably, m is any one integer of 1 to 10, and is more preferably any one integer of 1 to 5.

The alkoxysilane compound having a urethane bond may include a compound represented by Chemical Formula 1 below.

[Chemical Formula 1]

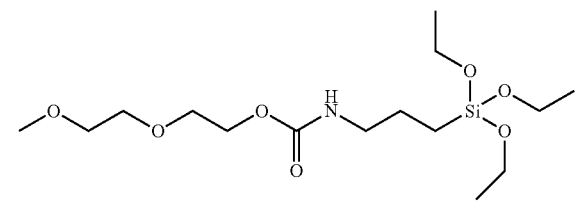

The alkoxysilane compound having a urethane bond may prevent crystallinity from being imparted due to tight bonding in the solid polymer electrolyte, and is responsible for coordinate bonding with a lithium ion, thus improving the ionic conductivity and mechanical properties of the solid polymer electrolyte.

Below is a description of a solid polymer electrolyte according to the present invention.

The present invention pertains to a solid polymer electrolyte, comprising: a matrix prepared by subjecting a compound represented by Structural Formula 1 below and an alkoxysilane compound including a compound represented by Structural Formula 2 below to a sol-gel reaction; and a lithium salt dispersed in the matrix.

[Structural Formula 1]

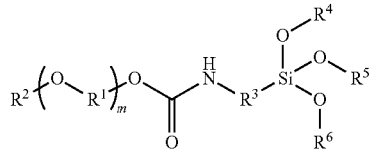

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

[Structural Formula 2]

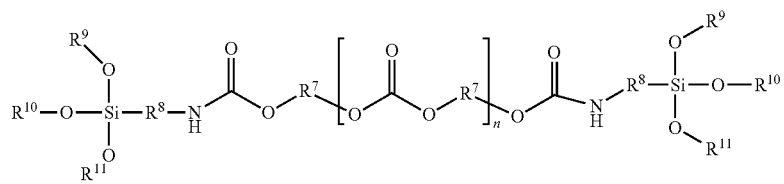

In Structural Formula 2, $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

Preferably, $R^7$ is independently a C4 to C10 alkylene group, and more preferably a C5 to C8 alkylene group.

Preferably, $R^8$ is independently a C1 to C6 alkylene group, and more preferably a C2 to C6 alkylene group.

Preferably, $R^9$ to $R^{11}$ are the same as or different from each other, and are each independently a C1 to C6 alkyl group, and specific examples thereof may include, but are not limited to, a methyl group, an ethyl group, a propyl group, an isopropyl group, a butyl group, a pentyl group, and a hexyl group.

Here, n is any one integer of 6 to 20, and preferably any one integer of 7 to 15.

The compound represented by Structural Formula 2 may have a weight average molecular weight (Mw) of 2,000 to 200,000, and preferably 3,000 to 20,000.

Polysilsesquioxane, functioning as a plasticizer for decreasing crystallinity, is linked to both ends of polycarbonate through urethane bonding, thus preparing a bridge-type polymer of Structural Formula 2.

The alkoxysilane compound may further include a compound represented by Structural Formula 3 below.

[Structural Formula 3]

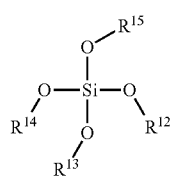

In Structural Formula 3, $R^{12}$ to $R^{15}$ are the same as or different from each other, and are each independently a C1 to C20 alkyl group.

Preferably, $R^{12}$ to $R^{15}$ are the same as or different from each other, and are each independently a C1 to C10 alkyl group, and more preferably a C1 to C6 alkyl group.

The compound represented by Structural Formula 3 may include tetraethyl orthosilicate (TEOS), tetramethyl orthosilicate, tetrapropyl orthosilicate, and tetrabutyl orthosilicate, and tetraethyl orthosilicate (TEOS) is preferably used.

The compound represented by Structural Formula 3 may react with the compound represented by Structural Formula 1 and the compound represented by Structural Formula 2 to give a matrix.

Examples of the lithium salt may include a lithium bis(trifluoromethane)sulfonimide salt, lithium perchlorate, lithium hexafluorophosphate, lithium tetrafluoroborate, and lithium trifluoromethanesulfonate, and preferably a lithium bis(trifluoromethane)sulfonimide salt is used.

The solid polymer electrolyte may include 1 to 30 wt % of the compound represented by Structural Formula 1 below, 15 to 50 wt % of the compound represented by Structural Formula 2 below, and 10 to 70 wt % of the lithium salt.

[Structural Formula 1]

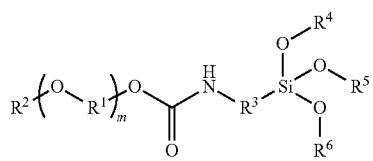

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

[Structural Formula 2]

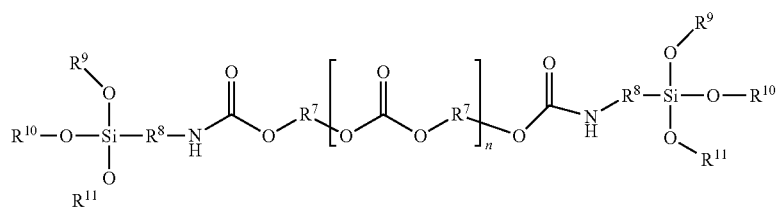

In Structural Formula 2, $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

In addition, the present invention pertains to a lithium secondary battery including the solid polymer electrolyte.

Below is a description of a method of preparing the solid polymer electrolyte according to the present invention.

Specifically, an alkoxy alcohol represented by Structural Formula 4 below and an isocyanate-based compound represented by Structural Formula 5 below are reacted, thus preparing an alkoxysilane compound having a urethane bond represented by Structural Formula 1 below (step a).

[Structural Formula 4]

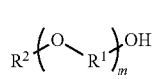

In Structural Formula 4, $R^1$ is a C1 to C20 alkylene group, $R^2$ is a C1 to C20 alkyl group, and m is any one integer of 1 to 20.

[Structural Formula 5]

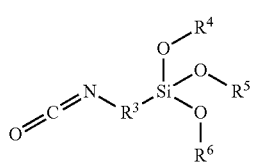

In Structural Formula 5, $R^3$ is a C1 to C20 alkylene group, and $R^4$ to $R^6$ are the same as or different from each other, and are each independently a C1 to C20 alkyl group.

[Structural Formula 1]

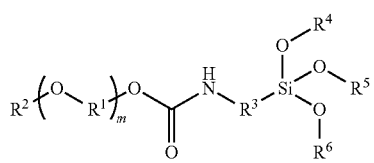

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

The alkoxy alcohol may include 2-(2-methoxyethoxy)ethanol, diethylene glycol methyl ether, triethylene glycol methyl ether, monoethylene glycol ethyl ether, diethylene glycol ethyl ether, diethylene glycol propyl ether, and diethylene glycol butyl ether, and preferably 2-(2-methoxyethoxy)ethanol is used.

The isocyanate-based compound represented by Structural Formula may include 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate, and preferably 3-(triethoxysilyl)propyl isocyanate is used.

Next, polycarbonate diol represented by Structural Formula 6 below and isocyanate-based silane represented by Structural Formula 7 below are subjected to a condensation reaction, thus preparing an alkoxysilane compound represented by Structural Formula 2 below (step b).

[Structural Formula 6]

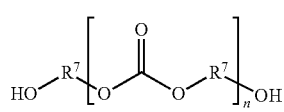

In Structural Formula 6, $R^7$ is independently a C1 to C20 alkylene group, and n is any one integer of 1 to 30.

[Structural Formula 7]

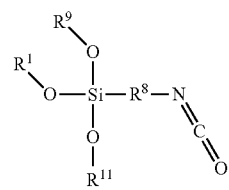

In Structural Formula 7, $R^8$ is independently a C1 to C20 alkylene group, and $R^9$ to $R^{11}$ are the same as or different from each other, and are each independently a C1 to C20 alkyl group.

[Structural Formula 2]

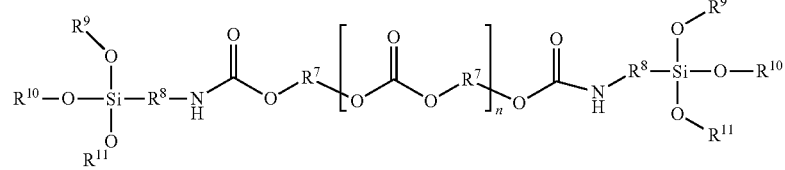

In Structural Formula 2, $R^7$ is independently a C1 to C20 alkylene group, $R^8$ is independently a C1 to C20 alkylene group, $R^9$ to $R^1$ are the same as or different from each other, and are each independently a C1 to C20 alkyl group, and n is any one integer of 1 to 30.

The polycarbonate diol may include bis(6-hydroxyhexyl)carbonate, bis(2-hydroxyethyl)carbonate, bis(3-hydroxypropyl)carbonate, bis(4-hydroxybutyl)carbonate, and bis(5-hydroxypentyl)carbonate, and preferably bis(6-hydroxyhexyl)carbonate is used.

The isocyanate-based silane may include 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate, and preferably 3-(triethoxysilyl)propyl isocyanate is used.

Here, the isocyanate-based silane may be a compound that is the same as the isocyanate-based compound represented by Structural Formula 5.

The above reaction may be carried out in a nitrogen atmosphere and a vacuum atmosphere, and specifically, a vacuum atmosphere and a nitrogen atmosphere may be alternately applied in order to remove water remaining in the flask.

The polycarbonate diol represented by Structural Formula 6 and the isocyanate-based silane represented by Structural Formula 7 are reacted at a molar ratio of 1:2 to 1:2.5.

In order to allow the isocyanate-based silane to react with two hydroxyl groups (—OH) substituted at ends of the polycarbonate diol, the isocyanate-based silane compound has to be added in a molar amount at least two times as high as the molar amount of the polycarbonate diol.

Next, the alkoxysilane compound having a urethane bond represented by Structural Formula 1 below, the alkoxysilane compound represented by Structural Formula 2 below, and a lithium salt are mixed, thus preparing a mixture (step c).

[Structural Formula 1]

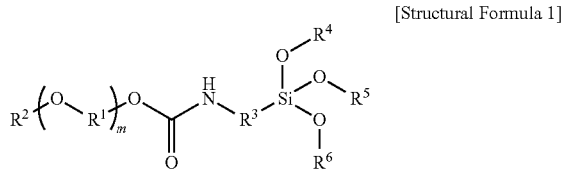

In Structural Formula 1, $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20.

[Structural Formula 2]

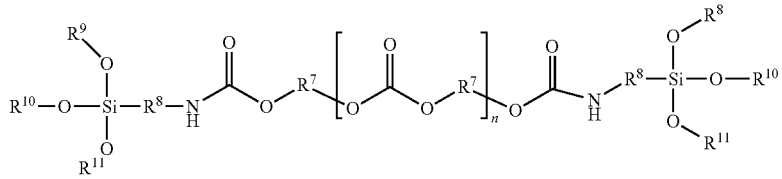

In Structural Formula 2, $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

A compound represented by Structural Formula 3 below may be further included.

[Structural Formula 3]

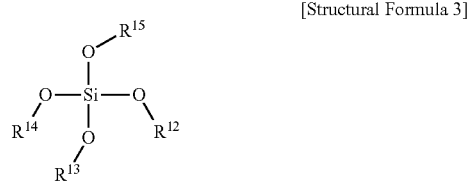

In Structural Formula 3, $R^{12}$ to $R^{15}$ are the same as or different from each other, and are each independently a C1 to C20 alkyl group.

Finally, the mixture is subjected to a sol-gel reaction, thus preparing a solid polymer electrolyte (step d).

The matrix containing alkoxysilane may be formed through sol-gel reaction.

Also, the present invention pertains to a method of manufacturing a lithium secondary battery including the method of preparing the solid polymer electrolyte as above.

A better understanding of the present invention will be given through the following preferred examples, which are merely set forth to illustrate the present invention but are not to be construed as limiting the scope of the present invention.

EXAMPLES

Example 1: Synthesis of Alkoxysilane Compound Having Urethane Bond

The method of preparing an alkoxysilane compound having a urethane bond in Example 1 is represented in Scheme 1 below.

2-(2-methoxyethoxy)ethanol (12.01 μg, 0.1 μmol) and 3-(triethoxysilyl)propyl isocyanate (24.78 g, 0.1 mol) were mixed at a molar ratio of 1:1 in a 100 mL round-bottom flask. The flask containing reagents was heated to 100° C. with stirring, and vacuum and nitrogen were alternately applied about three times using a Schlenk line in order to remove water remaining in the flask. The temperature was elevated to 130° C. and the stirring rate was fixed to 450 rpm, and the reaction was carried out under a nitrogen stream for 2 hr, thus preparing alkoxysilane having a urethane bond as a viscous liquid.

The results of $^1$H NMR analysis of the alkoxysilane compound having a urethane bond of Example 1 are shown in FIG. 1, from which the synthesis of the alkoxysilane compound having a urethane bond was confirmed.

[Scheme 1]

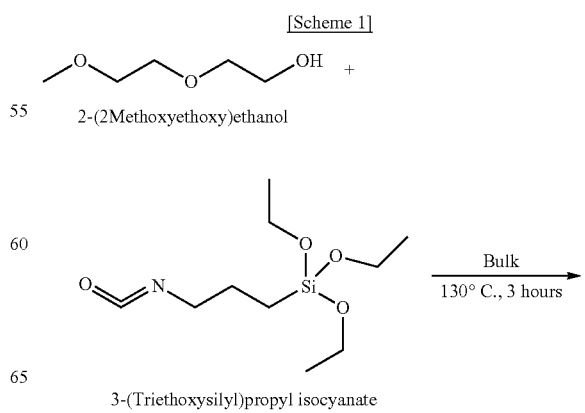

2-(2Methoxyethoxy)ethanol 3-(Triethoxysilyl)propyl isocyanate

-continued

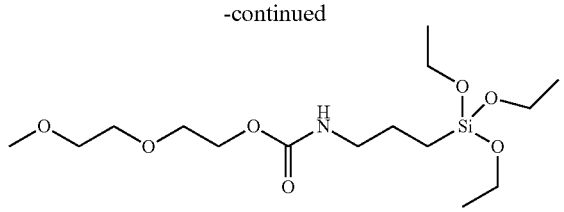

Compound of Example 1

Example 2: Synthesis of Alkoxysilane Compound

The method of preparing an alkoxysilane compound in Example 2 is represented in Scheme 2 below.

Polycarbonate diol (PCD) (40.00 g, 0.020 mol) and 3-(triethoxysilyl)propyl isocyanate (10.88 g, 0.044 mol) were mixed at a molar ratio of 1:2.2 in a 100 mL round-bottom flask, thus preparing a mixture.

The mixture was heated to 100° C. with stirring, and vacuum and nitrogen were alternately applied about three times using a Schlenk line in order to remove water remaining in the flask.

Thereafter, the temperature was elevated to 130° C. and the stirring rate was fixed to 450 rpm, and the reaction was carried out under a nitrogen stream for 2 hr, thus obtaining an alkoxysilane compound as a viscous liquid.

Figure 3:
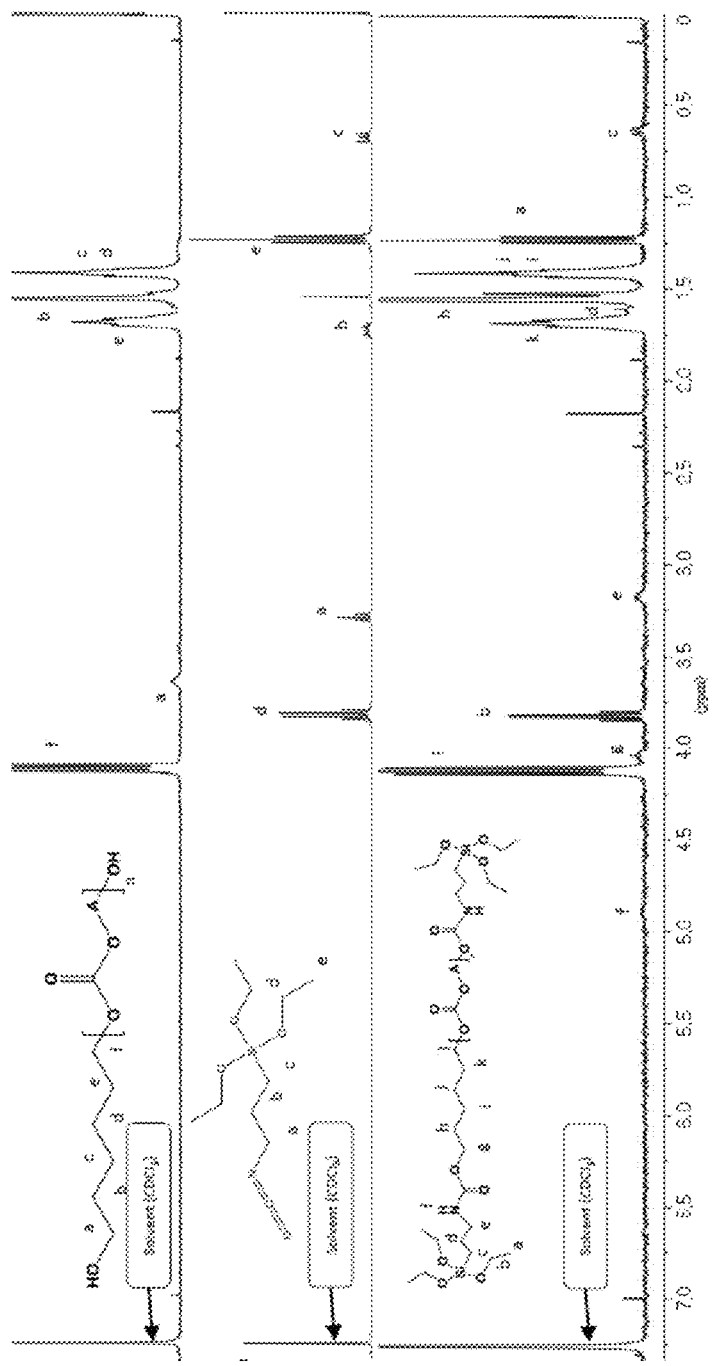
FIG. 3 shows the results of NMR analysis of an alkoxysilane compound prepared in Example 2.

The results of $^1$H NMR analysis of the alkoxysilane compound of Example 2 are shown in FIG. 3.

imide lithium salt) to give a mixture. The mixture was added with HCl (0.1 M, 0.5 mL) for a sol-gel reaction, and was then placed in a petri dish made of PP before curing the reaction solution, after which the petri dish was placed on a heating plate (70° C.) for about 1 hr. In order to sufficiently remove the solvent, the petri dish was placed in a vacuum oven (50° C.) for about 24 hr, ultimately preparing a solid polymer electrolyte in a film phase.

Example 4: Preparation of Solid Polymer Electrolyte

A solid polymer electrolyte was prepared in the same manner as in Example 3, with the exception that TEOS was added in an amount of 0.5 g in lieu of 0.1 g in Example 3.

Example 5: Preparation of Solid Polymer Electrolyte 1 g of the alkoxysilane compound of Example 2 and 0.25 g of the alkoxysilane compound having a urethane bond of Example 1 were sequentially added, mixed with 4 mL of acetone and thus dissolved, thus preparing a mixed solution.

The mixed solution was added with 1.0 g of a lithium salt (bis(trifluoromethane)sulfonimide lithium salt) to give a mixture. The mixture was added with HCl (0.1 M, 0.5 mL) for a sol-gel reaction, and was then placed in a petri dish before curing the reaction solution, after which the petri dish was placed on a heating plate (70° C.) for about 1 hr. In order to sufficiently remove the solvent, the petri dish was placed

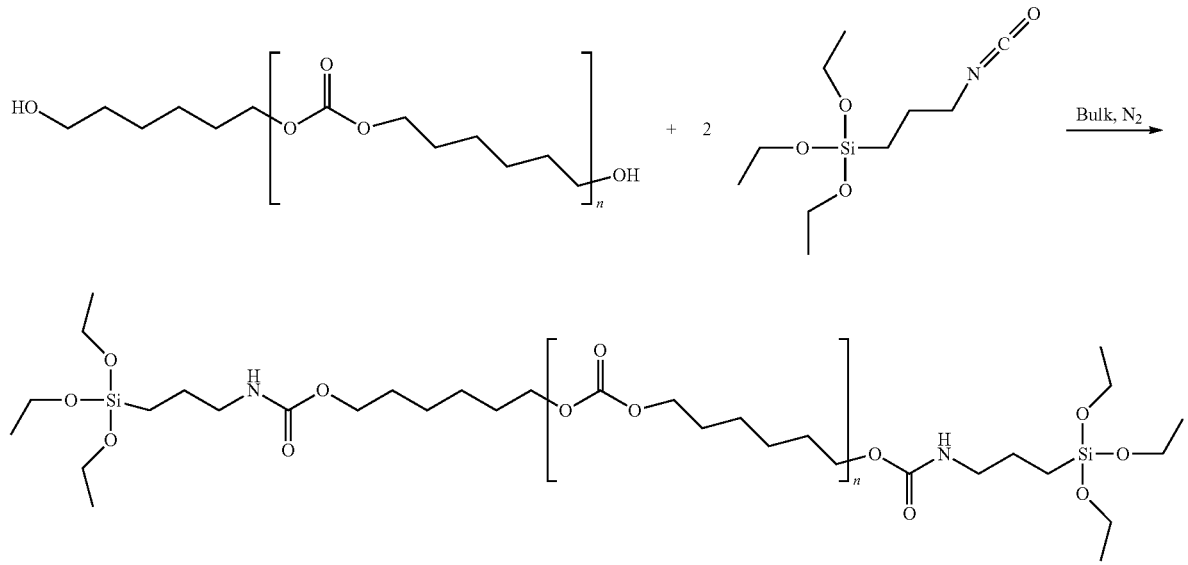

[Scheme 2]

Example 3: Preparation of Solid Polymer Electrolyte 1 g of the alkoxysilane compound of Example 2, 0.1 g of the alkoxysilane compound having a urethane bond of Example 1, and 0.1 g of TEOS were sequentially added and mixed with 4 mL of acetone and thus dissolved, thereby preparing a mixed solution. The mixed solution was added with 2.0 μg of a lithium salt (bis(trifluoromethane)sulfonin a vacuum oven (50° C.) for about 24 hr, thus preparing a solid polymer electrolyte in a film phase.

Example 6: Preparation of Solid Polymer Electrolyte

A solid polymer electrolyte was prepared in the same manner as in Example 5, with the exception that the alkoxysilane compound having a urethane bond of Example 1 was added in an amount of 0.7 g in lieu of 0.25 g in Example 5.

Example 7: Preparation of Solid Polymer Electrolyte

A solid polymer electrolyte was prepared in the same manner as in Example 5, with the exception that 0.1 g of the alkoxysilane compound having a urethane bond of Example 1 and 2.0 g of the lithium salt (bis(trifluoromethane)sulfonimide lithium salt) were added, in lieu of 0.25 g of the alkoxysilane compound having a urethane bond of Example 1 and 1.0 g of the lithium salt (bis(trifluoromethane)sulfonimide lithium salt) in Example 5.

Example 8: Preparation of Solid Polymer Electrolyte

A solid polymer electrolyte was prepared in the same manner as in Example 5, with the exception that 0.5 g of the alkoxysilane compound having a urethane bond of Example 1 and 2.0 g of the lithium salt (bis(trifluoromethane)sulfonimide lithium salt) were added, in lieu of 0.25 g of the alkoxysilane compound having a urethane bond of Example 1 and 1.0 g of the lithium salt (bis(trifluoromethane)sulfonimide lithium salt) in Example 5.

The amounts of components contained in the solid polymer electrolytes of Examples 3 to 8 are summarized in Table 1 below.

TABLE 1

| No. | Alkoxysilane compound of Example 2 (g) | Alkoxysilane compound of Example 1 (g) | TEOS (g) | Lithium salt (LiTFSI) (g) |
|---|---|---|---|---|
| Example 3 | 1 | 0.1 | 0.1 | 2.0 |
| Example 4 | 1 | 0.1 | 0.5 | 2.0 |
| Example 5 | 1 | 0.25 | — | 1.0 |
| Example 6 | 1 | 0.7 | — | 1.0 |
| Example 7 | 1 | 0.1 | — | 2.0 |
| Example 8 | 1 | 0.5 | — | 2.0 |

TEST EXAMPLES

Test Example 1: NMR Analysis

FIG. 1 shows the results of NMR analysis of the alkoxy alcohol and the alkoxysilane compound having a urethane bond of Example 1, and FIG. 3 shows the results of NMR analysis of polycarbonate diol, 3-(triethoxysilyl)propyl isocyanate, and the alkoxysilane compound of Example 2, dissolved in $CDCl_3$.

As shown in FIG. 1, the OH group responsible for the OH peak in alkoxy alcohol disappeared, and an N—H peak was observed through urethane bonding with 3-(triethoxysilyl) propyl isocyanate, from which the alkoxysilane having a urethane bond was confirmed to be synthesized.

As shown in FIG. 3, amine $CH_2$—NH—C=OO—C was observed at 4.8 ppm, from which the alkoxysilane compound of Example 2 was confirmed to be synthesized.

Test Example 2: IR Analysis

Figure 2:
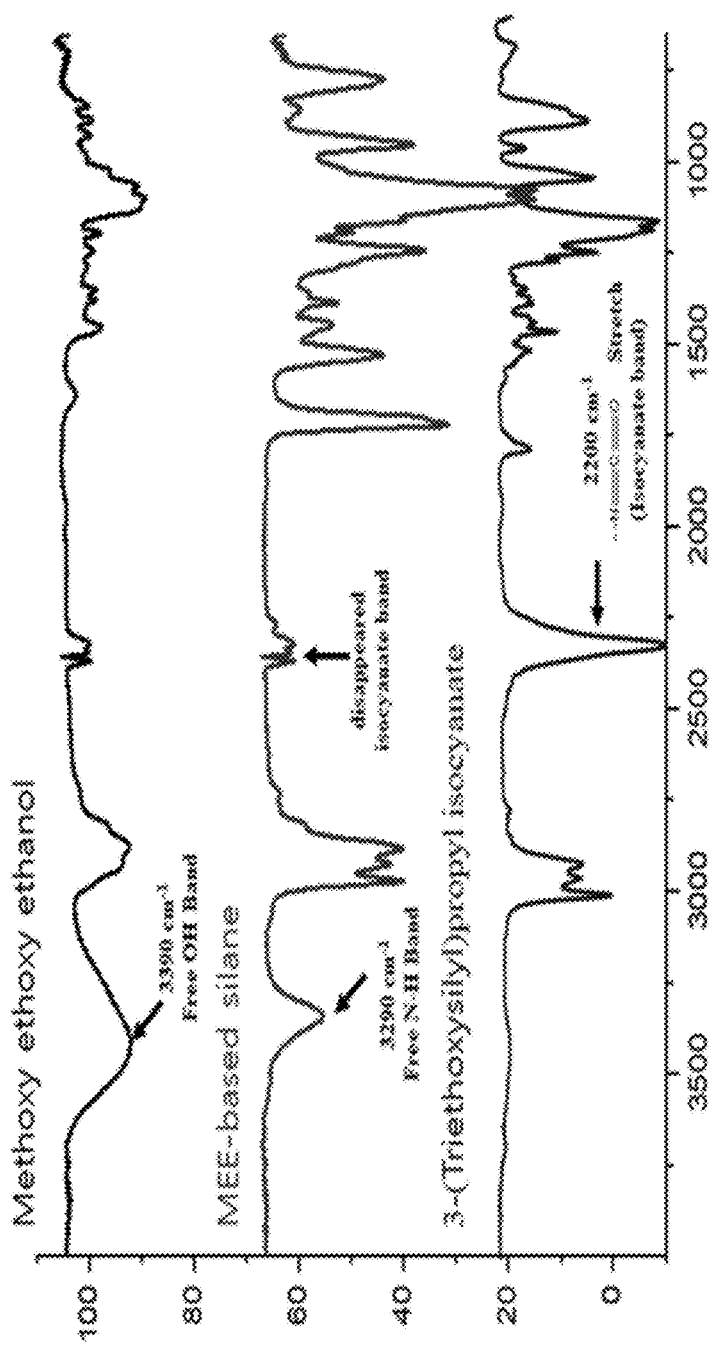
FIG. 2 shows the results of infrared (IR) spectroscopy analysis of the alkoxysilane compound having a urethane bond prepared in Example 1.
Figure 4:
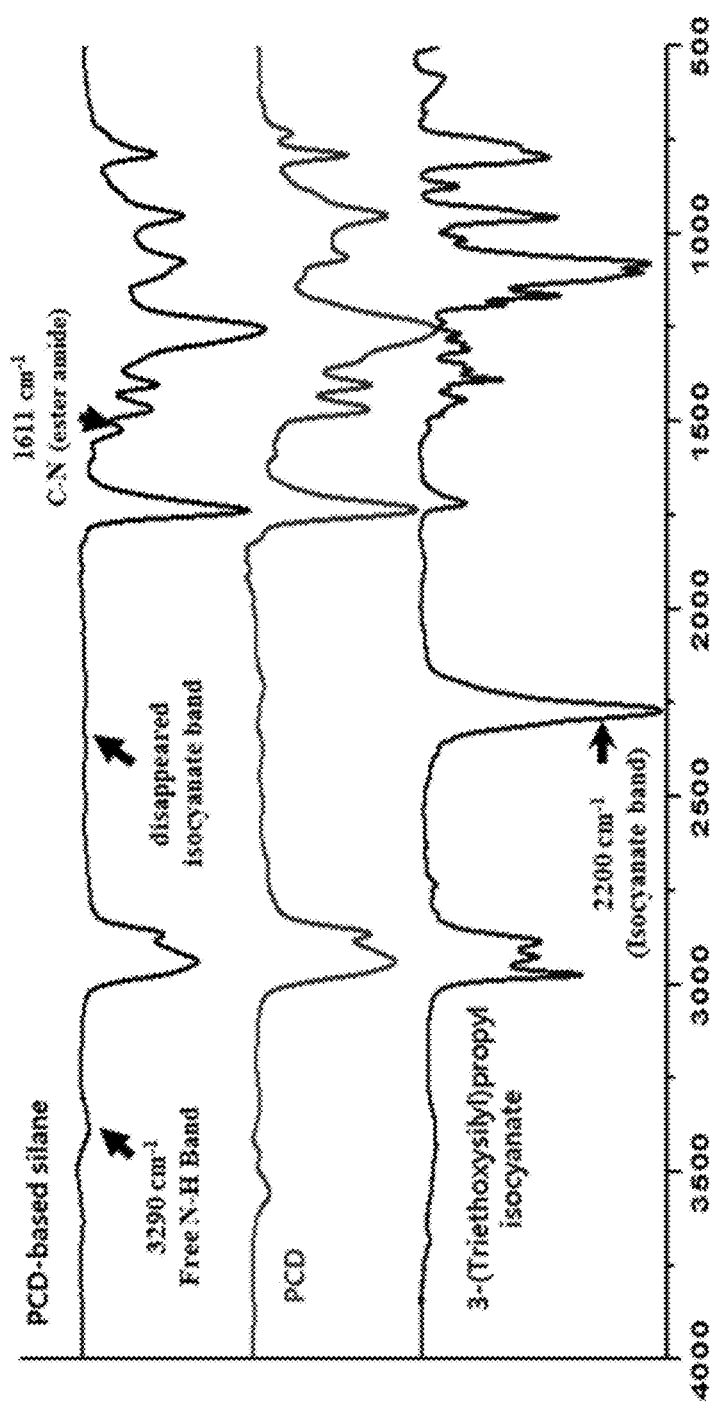
FIG. 4 shows the results of IR spectroscopy analysis of the alkoxysilane compound prepared in Example 2.
Figure 5:
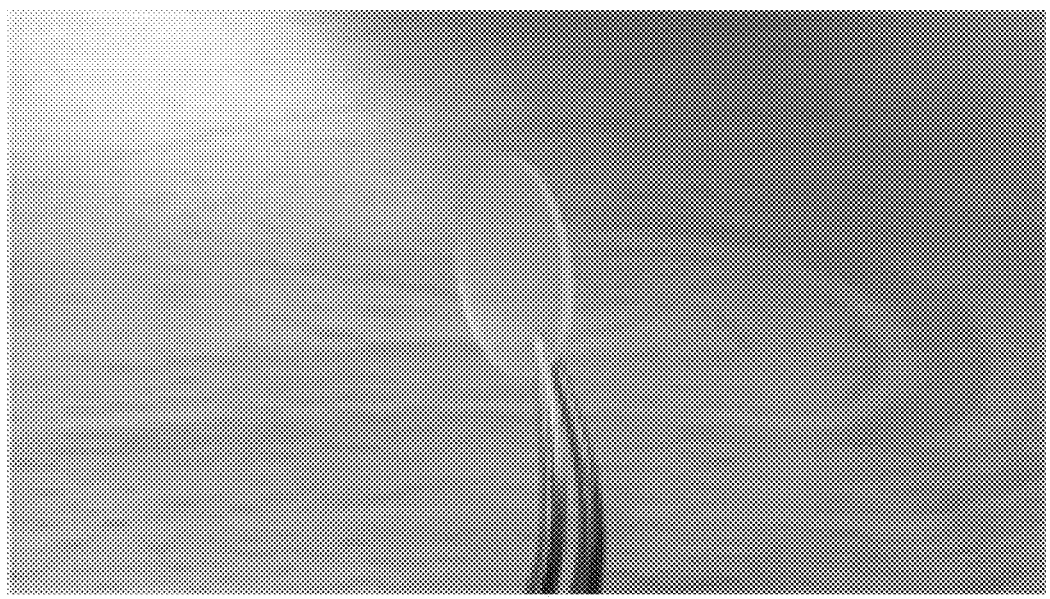
FIG. 5 shows a solid polymer electrolyte film prepared in Examples 3 to 8.

FIG. 2 shows the results of IR analysis of methoxyethoxy ethanol (alkoxy ethanol), 3-(triethoxysilyl)propyl isocyanate and the alkoxysilane compound having a urethane bond of Example 1, and FIG. 4 shows the results of IR analysis of polycarbonate diol, 3-(triethoxysilyl)propyl isocyanate and the alkoxysilane compound of Example 2.

As shown in FIG. 2, the OH bond of the N=C=O group in 3-(triethoxysilyl)propyl isocyanate was formed, and thus the N=C=O group at 2200 $cm^{-1}$ disappeared. Thus, alkoxysilane having a urethane bond was confirmed to be synthesized.

As shown in FIG. 4, based on the results of measurement of transmittance in the wavenumber range of 500 to 4000 $cm^{-1}$, the isocyanate peak (2200 $cm^{-1}$) disappeared, and the —NH bond peak was observed at 3290 $cm^{-1}$, and the presence of a C—N bond was observed at 1611 $cm^{-1}$. Thus, the alkoxysilane compound of Example 2 was confirmed to be synthesized.

Test Example 3: Analysis of Ionic Conductivity

The results of analysis of ionic conductivity depending on the amounts of the components of the solid electrolytes of Examples 3 to 8 are shown in Table 2 below.

TABLE 2

| No. | Alkoxysilane compound of Example 2 (g) | Alkoxysilane compound of Example 1 (g) | TEOS (g) | Lithium salt (LiTFSI) (g) | Ionic conductivity (S/cm) |
|---|---|---|---|---|---|
| Example 3 | 1 | 0.1 | 0.1 | 2.0 | $5.2 \times 10^{-5}$ |
| Example 4 | 1 | 0.1 | 0.5 | 2.0 | $5.2 \times 10^{-5}$ |
| Example 5 | 1 | 0.25 | — | 1.0 | $2.9 \times 10^{-4}$ |
| Example 6 | 1 | 0.7 | — | 1.0 | $4.4 \times 10^{-4}$ |
| Example 7 | 1 | 0.1 | — | 2.0 | $2.5 \times 10^{-3}$ |
| Example 8 | 1 | 0.5 | — | 2.0 | $2.6 \times 10^{-3}$ |

As is apparent from Table 2, the ionic conductivity of the solid polymer electrolytes of Examples 7 and 8 was superior.

Therefore, in order to obtain the solid polymer electrolyte having superior ionic conductivity, it can be found that TEOS (silica precursor) has to be added in an appropriate amount to the alkoxysilane compound of Example 1, the alkoxysilane compound of Example 2, and the lithium salt. Moreover, since ionic conductivity varies depending on the amount of the alkoxysilane compound of Example 1 that is added, it can also be confirmed that the alkoxysilane compound of Example 1 has to be added in an appropriate amount in order to obtain a solid polymer electrolyte having high ionic conductivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solid polymer electrolyte, comprising:
   a matrix prepared by subjecting an alkoxysilane compound having a urethane bone represented by Structural Formula 1 below and an alkoxysilane compound including a compound represented by Structural Formula 2 below to a sol-gel reaction; and
   a lithium salt dispersed in the matrix, Structural Formula 1

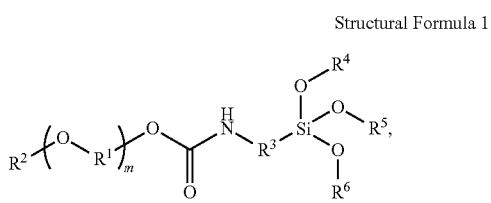

wherein $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20, and Structural Formula 2

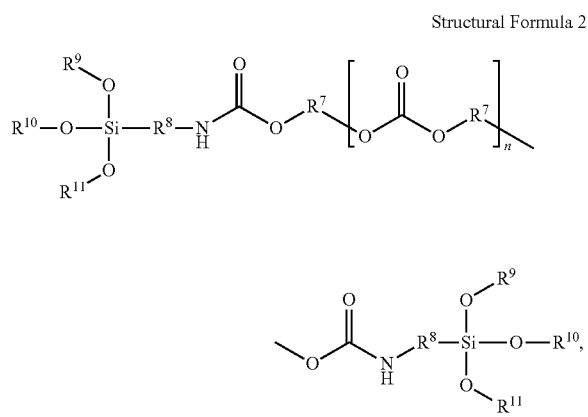

where $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

2. The solid polymer electrolyte of claim 1, wherein the alkoxysilane compound further includes a compound represented by Structural Formula 3 below:

Structural Formula 3

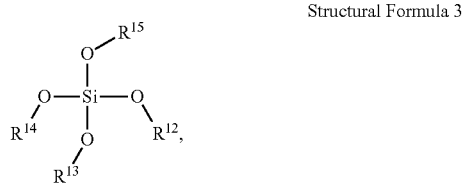

where $R^{12}$ to $R^{15}$ are the same as or different from each other, and are each independently a C1 to C20 alkyl group.

3. The solid polymer electrolyte of claim 1, wherein $R^7$ is independently a C4 to C10 alkylene group, $R^8$ is independently a C1 to C6 alkylene group, and $R^9$ to $R^{11}$ are the same as or different from each other, and are each independently a C1 to C6 alkyl group.

4. The solid polymer electrolyte of claim 1, wherein n is any one integer of 6 to 20.

5. The solid polymer electrolyte of claim 1, wherein the compound represented by Structural Formula 2 has a weight average molecular weight (Mw) of 2,000 to 200,000.

6. The solid polymer electrolyte of claim 3, wherein the lithium salt is selected from the group consisting a lithium bis(trifluoromethane)sulfonimide salt, a lithium perchlorate, a lithium hexafluorophosphate, a lithium tetrafluoroborate, a lithium trifluoromethanesulfonate, and combinations thereof.

7. The solid polymer electrolyte of claim 1, wherein the solid polymer electrolyte comprises:

1 to 30 wt % of the compound represented by Structural Formula 1;

15 to 50 wt % of the compound represented by Structural Formula 2 ; and 10 to 70 wt % of the lithium salt.

8. The solid polymer electrolyte of claim 1, wherein the solid polymer electrolyte further includes 0.5 to 20 wt % of a compound represented by Structural Formula 3 below:

Structural Formula 3

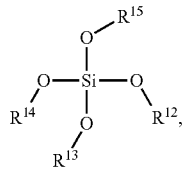

where $R^{12}$ to $R^{15}$ are the same as or different from each other, and are each independently a C1 to C20 alkyl group.

9. A lithium secondary battery, comprising the solid polymer electrolyte of claim 1.

10. A method of preparing a solid polymer electrolyte, comprising:

(a) preparing an alkoxysilane compound having a urethane bond represented by Structural Formula 1 below by reacting an alkoxy alcohol represented by Structural Formula 4 below with an isocyanate-based compound represented by Structural Formula 5 below;

(b) preparing an alkoxysilane compound represented by Structural Formula 2 below by subjecting a polycarbonate diol represented by Structural Formula 6 below and an isocyanate-based silane represented by Structural Formula 7 below to a condensation reaction;

(c) preparing a mixture by mixing the alkoxysilane compound having a urethane bond represented by Structural Formula 1 below, the alkoxysilane compound represented by Structural Formula 2 below, and a lithium salt; and (d) preparing a solid polymer electrolyte by subjecting the mixture to a sol-gel reaction, Structural Formula 4

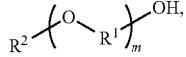

where $R^1$ is a C1 to C20 alkylene group, $R^2$ is a C1 to C20 alkyl group, and m is any one integer of 1 to 20, Structural Formula 5

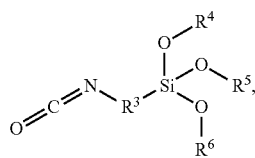

where $R^3$ is a C1 to C20 alkylene group, and $R^4$ to $R^6$ are the same as or different from each other, and are each independently a C1 to C20 alkyl group, Structural Formula 1

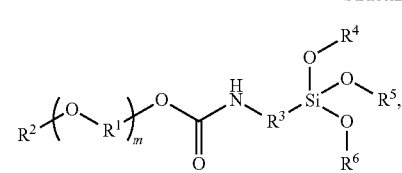

where $R^1$ is a C1 to C20 alkylene group, $R^2$ is a C1 to C20 alkyl group, $R^3$ is a C1 to C20 alkylene group, $R^4$ to $R^6$ are the same as or different from each other, and are each independently a C1 to C20 alkyl group, and m is any one integer of 1 to 20, Structural Formula 6

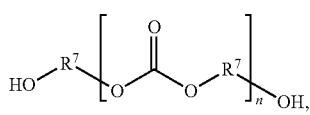

where $R^7$ is independently a C1 to C20 alkylene group, and n is any one integer of 1 to 30, Structural Formula 7

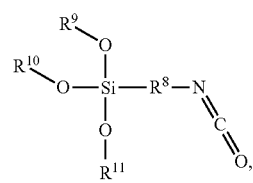

where $R^8$ is independently a C1 to C20 alkylene group, and $R^9$ to $R^{11}$ are the same as or different from each other, and are each independently a C1 to C20 alkyl group, and where $R^7$ is independently a C1 to C20 alkylene group, $R^8$ is independently a C1 to C20 alkylene group, $R^9$ to $R^{11}$ are the same as or different from each other, and are each independently a C1 to C20 alkyl group, and n is any one integer of 1 to 30.

11. The method of claim 10, wherein, in step (c), a compound represented by Structural Formula 3 below is further included:

Structural Formula 3

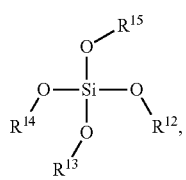

where $R^{12}$ to $R^{15}$ are the same as or different from each other, and are each independently a C1 to C20 alkyl group.

12. The method of claim 10, wherein the alkoxy alcohol is selected from the group consisting of a 2-(2-methoxyethoxy)ethanol, a diethylene glycol methyl ether, a triethylene glycol methyl ether, a monoethylene glycol ethyl ether, a diethylene glycol ethyl ether, a diethylene glycol propyl ether, a diethylene glycol butyl ether and combinations thereof.

13. The method of claim 10, wherein the isocyanate-based compound is from the group consisting of 3-(triethoxysilyl)propyl isocyanate, 3-(trimethoxysilyl)ethyl isocyanate, 3-(trimethoxysilyl)propyl isocyanate, 3-(trimethoxysilyl)butyl isocyanate, and 3-(triethoxysilyl)butyl isocyanate, and combinations thereof.

14. The method of claim 10, wherein the polycarbonate diol isselected from the group consisting of poly(1,6-hexanediol)carbonate, poly(1,5-pentanediol)carbonate, poly(1,4-butanediol)carbonate, poly(1,3-propanediol)carbonate, and poly(ethyleneglycol)carbonate, and combinations thereof.

15. The method of claim 10, wherein, in step (b), the polycarbonate diol represented by Structural Formula 6 and the isocyanate-based silane represented by Structural Formula 7 are reacted at a molar ratio of 1:2 to 1:2.5.

Structural Formula 2

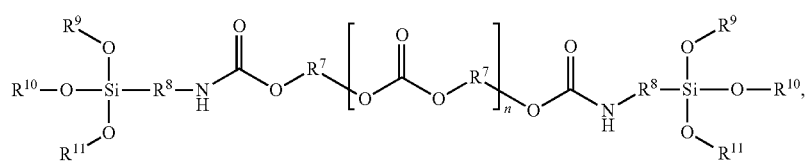

16. The method of claim 10, wherein, in step (d), a matrix is formed through the sol-gel reaction.

17. A method of manufacturing a lithium secondary battery, including the method of preparing the solid polymer electrolyte of claim 10.

\* \* \* \* \*